(12) United States Patent
McCormack et al.

(10) Patent No.: US 7,979,477 B2
(45) Date of Patent: Jul. 12, 2011

(54) PLACEHOLDER CONTROL FOR UPDATING DATABASE OBJECT

(75) Inventors: Michael J. McCormack, Snohomish, WA (US); Timothy E. Getsch, Redmond, WA (US); Paul Karimov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/049,306

(22) Filed: Mar. 15, 2008

(65) Prior Publication Data

US 2009/0234881 A1 Sep. 17, 2009

(51) Int. Cl.
*G06F 17/30* (2006.01)

(52) U.S. Cl. ......... 707/807; 707/758; 707/802; 715/705

(58) Field of Classification Search .................. None
See application file for complete search history.

(56) References Cited

U.S. PATENT DOCUMENTS

| | | | | |
|---|---|---|---|---|
| 4,939,689 A | * | 7/1990 | Davis et al. ............................ | 1/1 |
| 5,418,950 A | * | 5/1995 | Li et al. ........................ | 715/781 |
| 5,426,781 A | * | 6/1995 | Kaplan et al. ........................ | 1/1 |
| 5,444,841 A | * | 8/1995 | Glaser et al. .................. | 715/224 |
| 5,550,971 A | * | 8/1996 | Brunner et al. ....................... | 1/1 |
| 5,596,746 A | * | 1/1997 | Shen et al. ............................ | 1/1 |
| 5,704,028 A | * | 12/1997 | Schanel et al. ................. | 345/440 |
| 5,737,591 A | * | 4/1998 | Kaplan et al. ........................ | 1/1 |
| 5,794,030 A | * | 8/1998 | Morsi et al. .......................... | 1/1 |
| 5,950,190 A | * | 9/1999 | Yeager et al. ......................... | 1/1 |
| 6,026,408 A | * | 2/2000 | Srinivasan et al. ..................... | 1/1 |
| 6,148,296 A | * | 11/2000 | Tabbara ............................... | 1/1 |
| 6,160,549 A | | 12/2000 | Touma et al. .................. | 345/333 |
| 6,385,618 B1 | * | 5/2002 | Ng et al. ............................. | 1/1 |
| 6,484,150 B1 | * | 11/2002 | Blinn et al. ...................... | 705/26 |
| 6,501,491 B1 | * | 12/2002 | Brown et al. ................. | 715/853 |
| 6,553,380 B2 | * | 4/2003 | Minder ......................... | 707/714 |
| 6,609,133 B2 | * | 8/2003 | Ng et al. ............................. | 1/1 |
| 7,096,465 B1 | | 8/2006 | Dardinski et al. ............. | 717/178 |
| 7,117,504 B2 | | 10/2006 | Smith et al. .................... | 719/328 |
| 2005/0108271 A1 | * | 5/2005 | Hurmiz et al. ................. | 707/102 |
| 2005/0108732 A1 | | 5/2005 | Musson et al. ................ | 719/328 |
| 2005/0114435 A1 | | 5/2005 | DiPlacido et al. ............ | 709/202 |
| 2005/0278475 A1 | | 12/2005 | Karatal et al. ................. | 711/100 |
| 2006/0107225 A1 | | 5/2006 | Jones et al. .................... | 715/764 |
| 2006/0150110 A1 | | 7/2006 | Dietl et al. .................... | 715/760 |
| 2006/0282759 A1 | | 12/2006 | Collins et al. ................. | 715/500 |

(Continued)

OTHER PUBLICATIONS

Eric Smith, "Asp.Net Tip: Creating a Form Using PlaceHolder Controls," Aug. 24, 2006, http://www.codeguru.com/csharp/.net/net_asp/controls/article.php/c12495/, (5 pages).

(Continued)

*Primary Examiner* — Apu M Mofiz
*Assistant Examiner* — Hung D Le
(74) *Attorney, Agent, or Firm* — Merchant & Gould P.C.

(57) ABSTRACT

Updating a graphical database object in a database via a placeholder control is provided. After a database recordset schema or schema is updated, a determination is made as to whether a new field is to be added to the graphical database object in response to the recordset schema or schema change. If a new field is to be added, the new field is automatically added to the graphical database object. The new field may be positioned to a place in the graphical database object as directed by a user or editor of the database object. The graphical database object may be displayed with the new field as positioned based on the recordset schema or schema change.

18 Claims, 6 Drawing Sheets

U.S. PATENT DOCUMENTS

2007/0005634 A1    1/2007    Selca et al. ................... 707/102

OTHER PUBLICATIONS

Oracle Release 10.1.3.2, "Oracle Business Intelligence Publisher User Guide," 2005-2006, http://download.oracle.com/docs/cd/B40078_02/doc/bi.1013/b40017/T421739T481159.htm, Jul. 17, 2007 (15 pages).

Kovar, Stacy, "Implementing the Physical Database Model with Microsoft Access: Practice," http://129.130.25.70/skovar/greatplains/Access%20Practice.doc, Publicly known at least as early as Jul. 17, 2007. (39 pages).

Bean Software, "Dynamic User Interface in ASP.NET Web Applications," 2003-2006, http://www.beansoftware.com/ASP.NET-Tutorials/Dynamic-User-Interface.aspx, Jul. 17, 2007 (5 pages).

* cited by examiner

PLACEHOLDER CONTROL FOR UPDATING DATABASE OBJECT

BACKGROUND

In a conventional database system, users are often confused as to how to add a new field to a database object, for example, adding a comments field in a table containing lists of customers. Often a user will add such a field to a given table, but the user does not effect a change to the form based on that table. When the user subsequently opens the subject form, for example, a customer table form, the user may expect the new field, for example, customer comments field, but the new field is not present because the user's addition of the desired field to an instance of the subject table did not alter the underlying table form. That is, adding the new field to an instance of a given table does not cause the added field to be added to future instances of the table form which causes user confusion.

It is with respect to these and other considerations that the present invention has been made.

SUMMARY

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

Embodiments of the present invention solve the above and other problems by providing systems and methods for updating a graphical database object in a database.

According to one embodiment, use of a placeholder control allows for automatically projecting database object schema changes in future instances of associated database objects, for example, forms, reports, queries, data views, views and the like. According to another embodiment, updating a database object in a relational database is provided. When a database schema is updated and it is determined that a new field is to be added to an associated database object, the new field is automatically added to the associated object in response to updates to the database schema. After the new field is positioned in the associated object at a determined place or position, a graphical database object (for example, an associated database form) may be displayed along with the added field.

Determining whether the database schema has been updated may include determining whether a recordset schema has changed, the recordset schema being associated with the database object and the recordset schema including data associated with and defining a collection of records made available to the database object, comparing the updated recordset schema to a previous recordset schema to determine whether the updated recordset schema includes a new field not in the previous recordset schema, and comparing each field in the updated recordset schema to each field in the previous recordset schema to determine whether each field in the updated recordset schema has a matched field in the previous recordset schema. A field in the updated recordset schema having no matched field indicates the field to be a new field not in the previous recordset schema. The new field may then be positioned to a determined place in the database object, and the database object may be displayed to show a visualization of the new field in the displayed database object.

According to another embodiment, a system for updating a graphical database object in a database is provided. The system may include a schema update module that is programmed to update a database schema in the database and a graphical database object update module that is programmed to update the graphical database object in response to detecting a database schema change.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
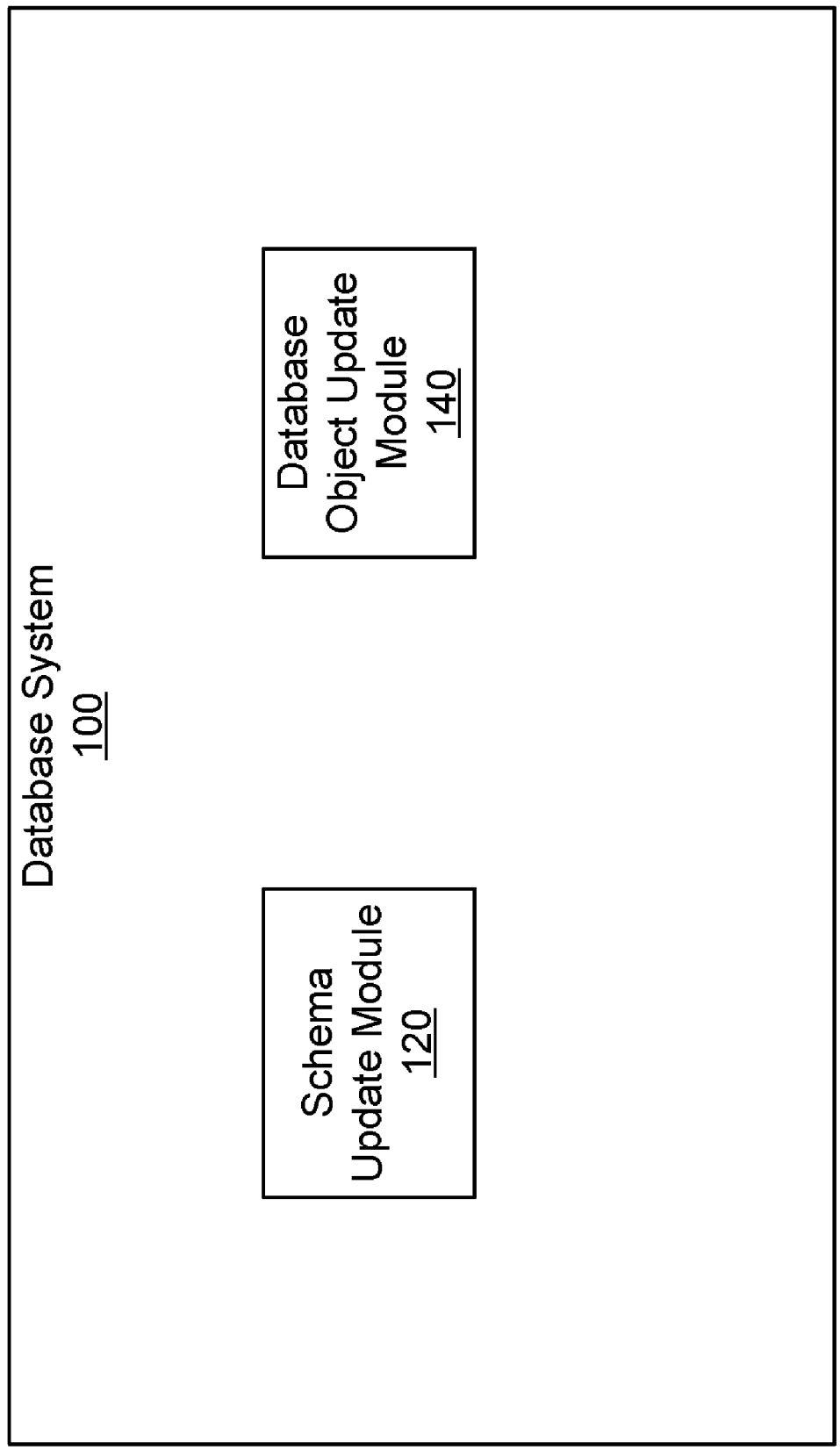
FIG. 1 is a block diagram illustrating a database system for updating a database object in response to detecting a database schema change in the database.

This disclosure will now more fully describe embodiments with reference to the accompanying drawings, in which specific embodiments are shown. Other aspects may, however, be embodied in many different objects and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments described herein relate to systems and methods of updating a graphical database object in a database.

FIG. 1 is a block diagram illustrating a database system 100 for updating a database object in response to detecting a database schema change in the database. FIG. 1 illustrates a database system for updating a database object, and it should be appreciated that a database object may include a vast number of suitable graphical database objects including database visualizations such as forms, reports, data views, views, queries, etc. The term database "object" will be used herein to mean any such suitable graphical database object.

The database system 100 includes a schema update module 120. The schema update module 120 is programmed to update a database schema. In one possible embodiment, a database schema includes tables in which data is stored in an associated database. For example, in a relational database, a database schema may define tables, fields in each table, and relationships between fields and tables. A database schema may be updated when a new field is added to a table.

The database system 100 also includes an object update module 140. The object update module 140 may be programmed to update a database object in response to detecting a database schema change. In one possible embodiment, the database object may be a database object on which a user places controls for taking actions or for entering, displaying, and editing data in fields. When a database schema may be updated by adding a new field to a database table and the new field is expected to show up in the database object, the object update module 140 updates the database object to add and display the new field in the database object. In other words, the new field may be added to and displayed in the database object when the new field is added to the table. A user thus may view the new field in the database object after the new field is added to the table. In one possible embodiment, the database object may also be updated in response to detecting a database schema change such as a table, query or a Structured Query Language (SQL) statement change.

Figure 2:
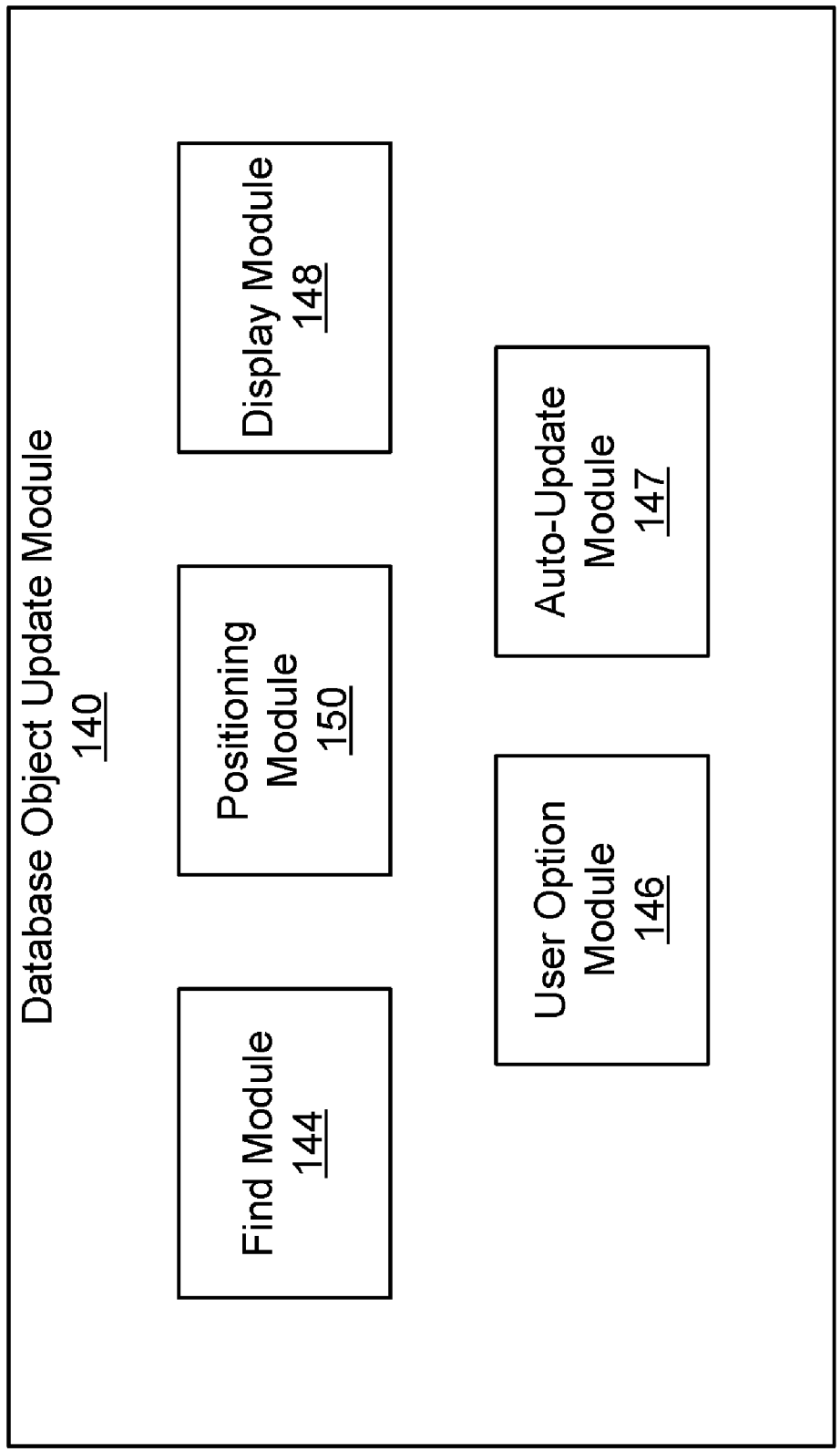
FIG. 2 is a block diagram illustrating an object update module of FIG. 1.

FIG. 2 is a block diagram illustrating an object update module 140 of FIG. 1. The object update module 140 includes a find module 144, a positioning module 150, and a display module 148. Records from an underlying source of data such as a table, query, or a SQL statement are made available for the database object. A recordset schema is used to describe those records. Thus, when a database schema is updated such as a table, query or a SQL statement change, the recordset schema may be updated as well.

The find module 144 may be programmed to find a new field in the updated recordset schema to be added to the database object after the database schema is updated. In one possible embodiment, the find module 144 may be programmed to compare the updated recordset schema to a previous recordset schema to determine whether the updated recordset schema includes any new field not in the previous recordset schema. The previous recordset schema is the recordset schema before the database schema is updated. In one possible embodiment, the previous recordset schema has been saved and cached for the comparison.

The find module 144 also may be programmed to compare each field in the updated recordset schema definition to each field in the previous recordset schema definition to determine whether each field in the updated recordset schema has a matched field in the previous recordset schema. If a field in the updated recordset schema can not be found to have previous match, the field is indicated as a new field. A new field is thus found and may be added to the database object.

The positioning module 150 may be programmed to position where a new field will be placed in the object. In other words, once a new field is found and determined to be added to the object through the find module 144, the positioning module 150 may determine where the new field is placed in the object through various mechanisms and implementations (illustrated in FIGS. 3A-3C).

The display module 148 may be programmed to display a new field in the object. In other words, once a new field is found and is positioned to where the new field is to be placed, the display module 148 may illustrate the visualization of the new field in the object.

The object update module 140 may also include an auto-update module 147 and a user option module 146. The auto-update module 147 may be programmed to automatically add and display the new field to the object once the new field is found as a new field. In other words, the new field may be dynamically added to and displayed in the object once a database schema has been modified to add the new field.

Alternatively, the user option module 146 may be programmed to determine whether the user wants a new field to be displayed in the object. In other words, the user may determine whether a new field will be displayed in the object. For example, even if a new field has been found to be added to the object due to a database schema change, a user may determine whether to have the new field inserted and displayed in the object. The user option feature gives a user more flexibility to control what fields are to be added and displayed in a given object.

Figure 3C:
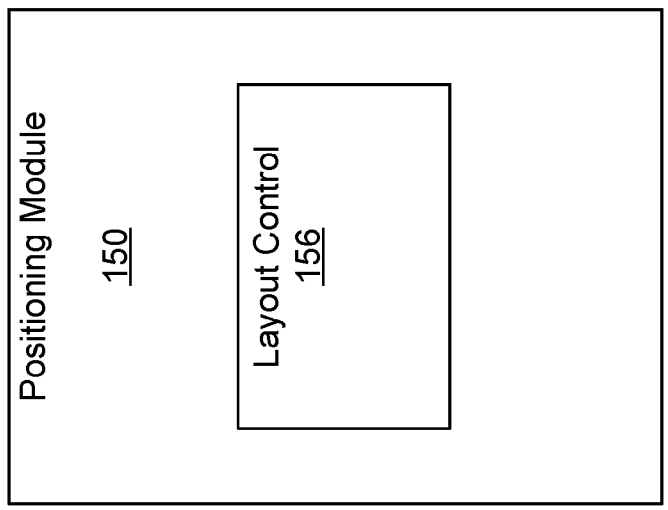
FIGS. 3A-3C are block diagrams illustrating various implementations for the positioning module of FIG. 2.
Figure 3B:
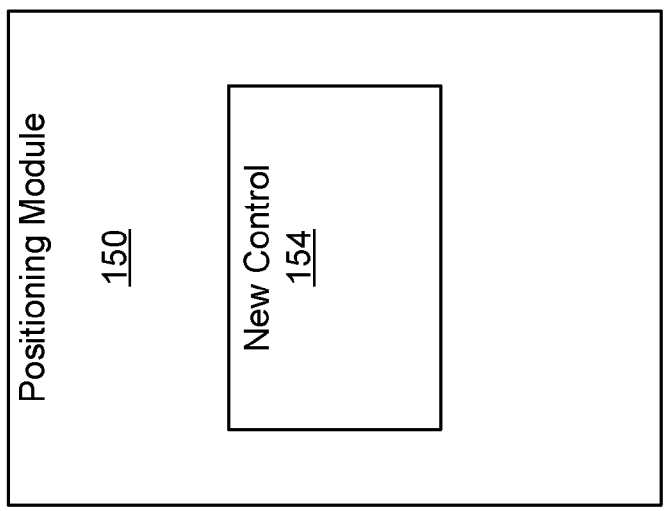
Figure 3A:
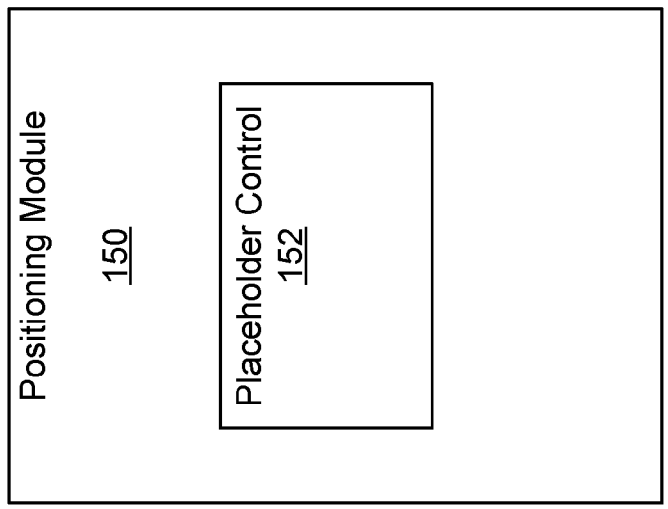

FIGS. 3A-3C are block diagrams illustrating various implementations for the positioning module 150 of FIG. 2. In particular, FIG. 3A illustrates that the positioning module 150 may be implemented through a placeholder control 152. In one possible embodiment, the placeholder control is a label and text box pair with a keyword such as "placeholder" in the tag of the control. In other words, a special tag may be added to the label and text box that is literally the string placeholder. Because the string exists, a user may then take that label and text box and interact with it accordingly. In one possible embodiment, the positioning module 150 may be programmed to look for the tag called the keyword such as "placeholder". Whenever a new field is found to be added in the object, the positioning module 150 may place the new field to a certain place or position at all times per the placeholder control 152, for example, to the left of the placeholder control 152 at all times or above the placeholder control at all times for each new field to be added. Therefore, a certain programmatic assumption may be applied for this implementation.

FIG. 3B illustrates that the positioning module 150 may be implemented through a new control 154. The new control 154 has special properties that a user may use to specify where a new field is placed. In one possible embodiment, the new control 154 is effectively a label and a text box, but with the special properties a user may layout in a given user interface. In other words, the implementation allows a user to fully control where the new field is inserted through the new control. For example, it is possible that a user could use different keywords instead of using the example word "placeholder". A user may use placeholder left, placeholder right, placeholder up, and placeholder down to achieve a same effect as the implementation shown in FIG. 3A.

FIG. 3C illustrates that the positioning module 150 may be implemented through a layout control 156. The layout control 156 manages the way controls are laid out upon an object. For example, a layout may be used to align all the labels and all the text boxes to a grid pattern. The layout control 156 may have a property that allows a user to specify as a function of the layout control, where to add new fields. Therefore, once a new field is found and is added to the object, the new field may be positioned to a place where the layout control 156 specifies in its property.

Figure 4:
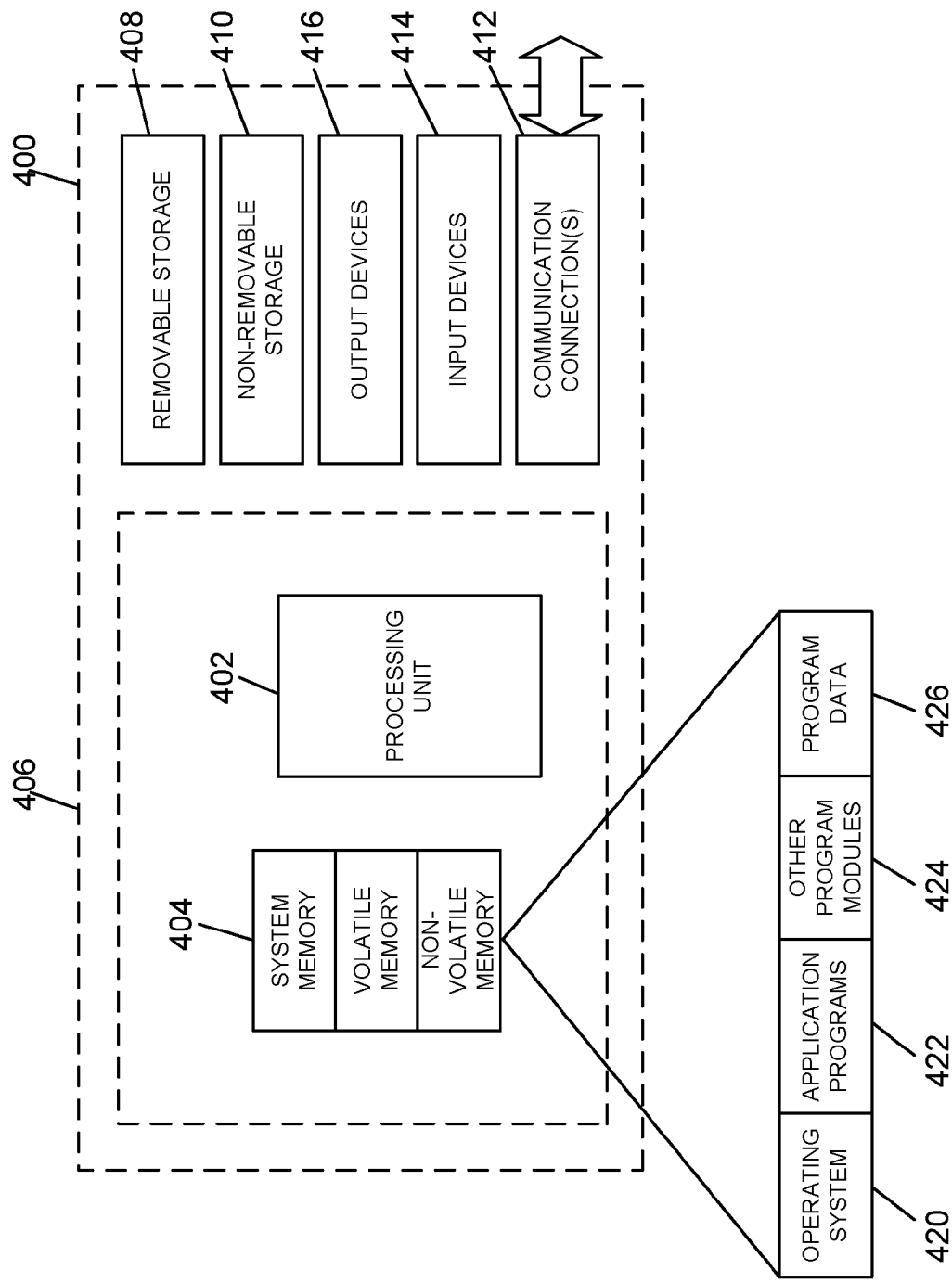
FIG. 4 illustrates an example computing system for implementing aspects of the present disclosure.

FIG. 4 is a computing system 400 for implementing aspects of the present disclosure. In its most basic configuration, computing system 400 typically includes at least one processing unit 402 and memory 404. For example, the database system 100 in FIG. 1 may be stored in memory 404. Depending on the exact configuration and type of computing system, memory 404 may be volatile (such as RAM), non-volatile (such as ROM, flash memory, etc.) or some combination of the two. This most basic configuration is illustrated in FIG. 4 by dashed line 406. Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and which can be accessed by computing system 400. Any such computer storage media may be part of computing system 400.

Computing system 400 may also contain communications connection(s) 412 that allow the computing system to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

In some embodiments, memory 404 includes one or more of operating system 420, application programs 422, other program modules 424, and program data 426. In some embodiments, global data, client-specific data, and transformation rules may each be stored in memory 404, removable storage 408, non-removable storage 410, or any other computer storage media described herein.

Figure 5:
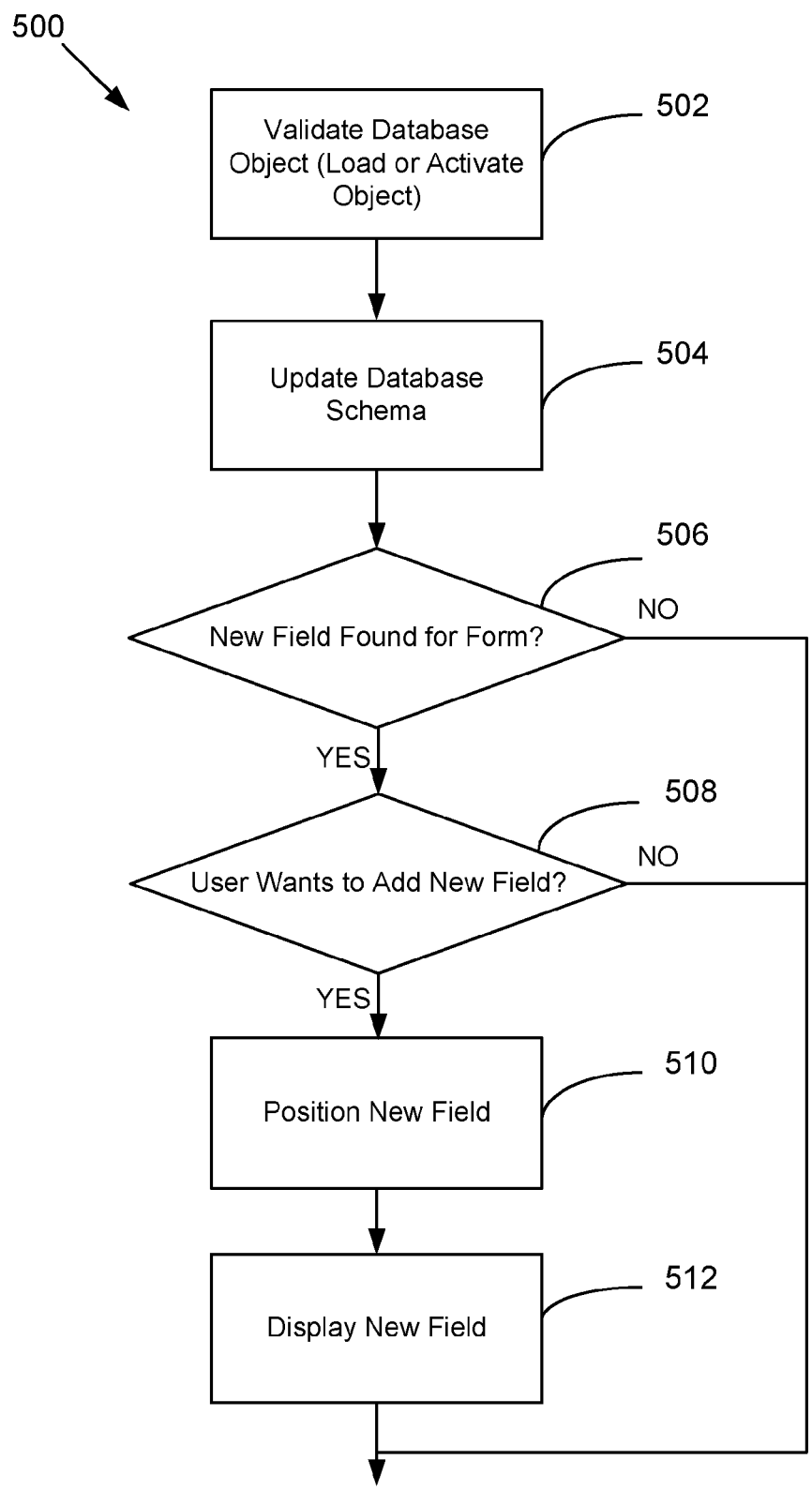
FIG. 5 illustrates a method of updating a database object in a database system.

FIG. 5 illustrates a method 500 of updating a database object in a database system. At operation 502, the database system validates the database object. In one possible embodiment, the recordset schema may be validated by loading and opening the object. In another possible embodiment, the recordset schema may be validated by activating the object.

Operational flow proceeds to operation 504. At operation 504, the database system updates a database schema. In one possible embodiment, the database schema includes the tables in which data is stored in the database. For example in a relational database, a database schema defines tables, fields in each table, and relationships between fields and tables. In one possible embodiment, the database system updates the database schema by adding a new field to a table in the database.

Operational flow proceeds to operation 506. At operation 506, the database system determines whether any new field is found to be added for the object due to a database schema change. One possible implementation of operation 506 is illustrated in more detail in FIG. 6, described below.

Operational flow proceeds to operation 508. At operation 508, the database system provides a user an option to determine whether to add a new field to the object. In particular, even if a new field has been found for the object due to a database schema change, the user may determine whether the user wants to have the new field inserted and displayed in the object. This user option feature gives a user more flexibility to control what fields are to be added and displayed in the object.

If operation 508 determines the user wants to insert a new field to the object, then operational flow branches "Yes" and operational flow proceeds to operation 510. If operation 508 determines the user does not want to insert the new field to the object, then operational flow branches "No" and operational flow skips operations 510 and 512 so that the new field will not be inserted and displayed in the object.

According to an alternative embodiment, the database system does not provide the user the option of determining whether to add and display the found new field to the object. In other words, according to this alternative embodiment, the found new field will be automatically added to and displayed in the object once the database schema has been modified to add the new field for the object. For this alternative embodiment, operational flow skips operation 508 and directly goes to operation 510 from operation 506 if any new field is found to be added to the object in operation 506.

At operation 510, the new field is positioned in the specified or determined place and is inserted in the object. In one possible embodiment, the new field is positioned through a placeholder control. The placeholder control may be a label and text box pair with a keyword such as "placeholder" in the tag of the control. In other words, a special tag is added to the label and text box that is literally the string placeholder. Because the string exists, a user may then take that label and text box and interact with it accordingly.

In another possible embodiment, the new field is positioned through a new control. The new control has special properties with which a user may specify where new fields are placed. For example, the new control may be effectively a label and a text box, but with the special properties a user may layout in a given user interface. In other words, the implementation allows a user to fully control where the new field is inserted through the new control. For example, it is possible that a user may use different keywords instead of using the example word "placeholder". A user may use placeholder left, placeholder right, placeholder up, and placeholder down to achieve a same effect.

In yet another possible embodiment, the new field is positioned through a layout control. The layout control manages the way controls are laid out upon an object. The layout control has a property that allows a user to specify as a function of the layout control, where to add new fields.

Operational flow proceeds to operation 512. At operation 512, the new field is displayed in the object. In other words, once a new field is found and positioned to where the new field is to be placed, the new field is displayed and visualized at operation 512. In one possible embodiment, at operation 512, the object is loaded and actually re-painted with the new field in the object so that the user is able to view the new field in the object.

Figure 6:
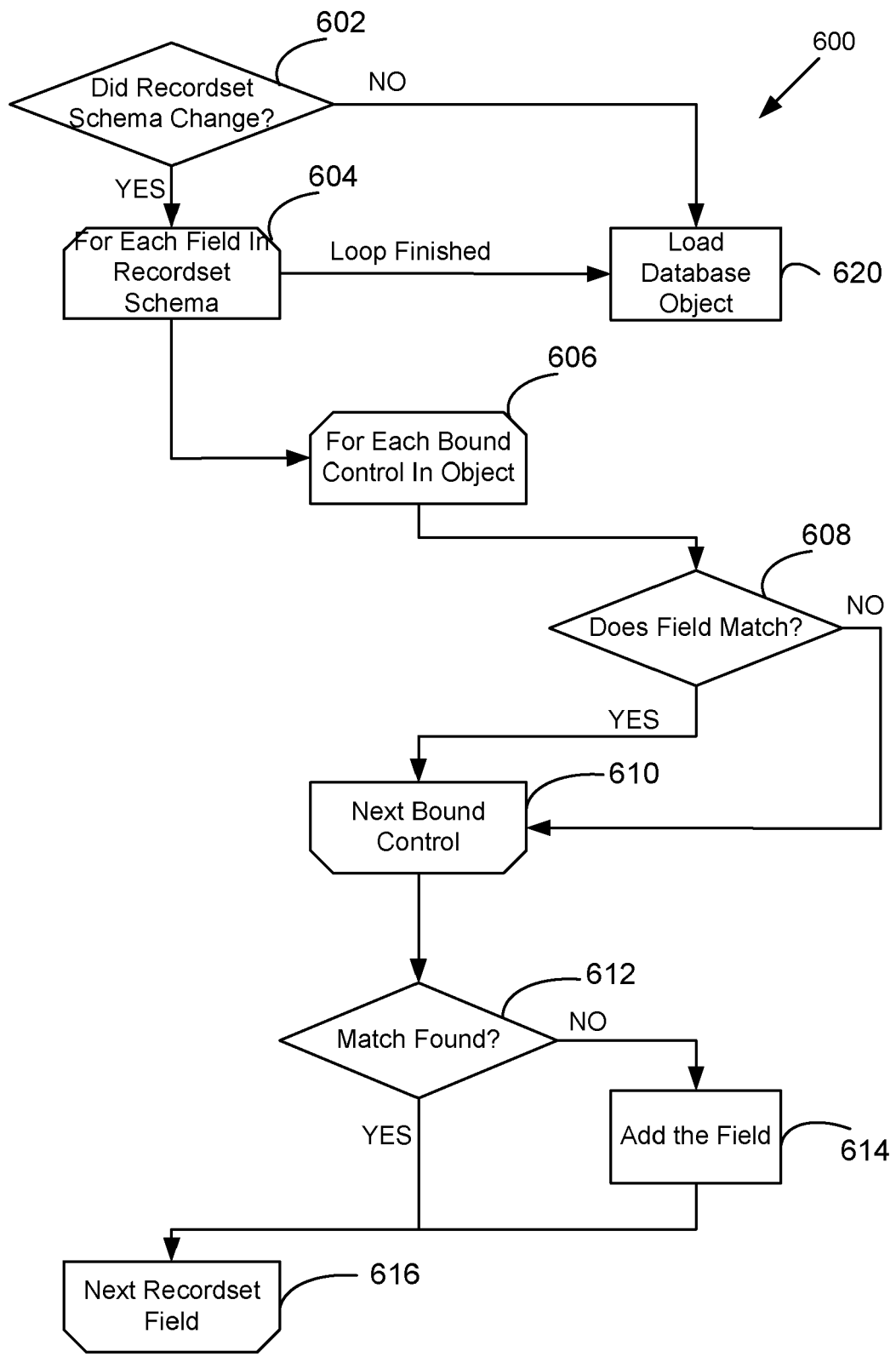
FIG. 6 illustrates a method of finding a new field for an object of FIG. 5.

FIG. 6 illustrates a method 600 of finding a new field for an object of FIG. 5. The method 600 includes one possible embodiment for operation 506 of FIG. 5. In the method 600 shown in FIG. 6, operational flow starts with operation 602 that determines whether the recordset for the object has changed. If operation 602 determines that the recordset schema has not changed, then operational flow branches "No" and operational flow proceeds to operation 620. The operation 620 loads the object without a new field to be added to the object.

If operation 602 determines that the recordset schema has changed, then operational flow branches "Yes" and operational flow proceeds to a loop operation 604. In the loop operation 604, each field in the updated recordset schema is compared with fields in the previous recordset schema. In particular, inside the loop operation 604, there is another loop operation 606. The loop operation 606 determines whether any bound control matches the field in the updated recordset schema. Namely, at operation 608, each bound control is checked with the field to see whether there is a bound control for the field. After operation 608, operational flow proceeds to operation 610 that indicates to process a next bound control.

After the loop operation 606 is completed, operational flow proceeds to operation 612. The operation 612 determines whether a field in the updated recordset schema matches any bound control. If operation 612 determines that the field has a matched bound control, then operational flow branches "Yes" and operational flow proceeds to operation 616 that indicates to process a next field in the recordset schema. If operation 612 determines that the field does not have any matched bound control, then operational flow branches "No" and operational flow proceeds to operation 614 that indicates the field is a new field and is to be added to the object. After operation 614, operational flow proceeds back to operation 616 that indicates to process a next field in the recordset schema.

After the loop operation 604 is completed, operational flow proceeds to operation 620 that loads the object with any new field found in the loop operation 604.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of updating a database object in a relational database, the method comprising:
   updating a recordset schema associated with the database object;
   loading or activating the database object;
   finding a new field to be added to the database object in response to a change in the recordset schema, including:
      determining whether a recordset schema has changed, the recordset schema being associated with the database object and being associated with a collection of records made available to the database object,
      comparing the updated recordset schema to a previous recordset schema associated with the database object to determine whether the updated recordset schema includes a new field not in the previous recordset schema, and
      comparing each field in the updated recordset schema to each field in the previous recordset schema to determine whether each field in the updated recordset schema has a matched field in the previous recordset schema, wherein determining whether each field in the updated recordset schema has a matched field in the previous recordset schema comprises determining, for each field, whether there is at least one of a plurality of bound controls for the field in the updated recordset schema, wherein the plurality of bound controls comprise controls placed on the database object for entering, displaying and editing field data, wherein a field in the updated recordset schema having no matched field indicates the field to be a new field not in the previous recordset schema;
   positioning the new field to a determined place in the database object;
   displaying a database visualization in the database object associated with the new field; and
   positioning the new field to a place determined by a placeholder control, the placeholder control comprising a label and text box pair with a keyword in a placeholder control tag, the tag comprising a string placeholder which is added to the label and the text box, the string placeholder enabling interaction with the label and the text box.

2. The method of claim 1, further comprising positioning the new field to a place determined by a new control having special properties to specify where to add the new field.

3. The method of claim 1, further comprising positioning the new field to a place determined by a layout control having a property to indicate where to add the new field.

4. The method of claim 1, further comprising automatically adding the new field to the database object.

5. The method of claim 1, positioning the new field to a place determined by a placeholder control comprises positioning the new field to a place determined by a placeholder control comprising at least one of the following keywords: placeholder left, placeholder right, placeholder up and placeholder down.

6. A method of updating a graphical database object in a database, the method comprising:
   updating a recordset schema in the database;
   finding a new field to be added to the graphical database object in response to the updated recordset schema, wherein the act of finding a new field to be added for the graphical database object comprises:
      determining whether a recordset schema has changed;
      comparing the updated recordset schema to a previous recordset schema to determine whether the updated recordset schema includes a new field not in the previous recordset schema; and
      comparing each field in the updated recordset schema to each field in the previous recordset schema to determine whether each field in the updated recordset schema has a matched bound control in the previous recordset schema, wherein determining whether each field in the updated recordset schema has a matched bound control in the previous recordset schema comprises determining, for each field, whether there is at least one of a plurality of bound controls for the field in the updated recordset schema, wherein the plurality of bound controls comprise controls placed on the graphical database object for entering, displaying and editing field data, wherein a field in the updated recordset schema having no matched bound control indicates the field to be a new field not in the previous recordset schema;
   automatically adding the new field to the graphical database object;
   positioning the new field to a determined place in the graphical database object;
   displaying the graphical database object with the new field; and
   positioning the new field to a place determined by a placeholder control, the placeholder control comprising a label and text box pair with a keyword in a placeholder control tag, the tag comprising a string placeholder which is added to the label and the text box, the string placeholder enabling interaction with the label and the text box.

7. The method of claim 6, further comprising positioning the new field to a place determined by a new control having special properties to specify where to add the new field.

8. The method of claim 6, further comprising positioning the new field to a place determined by a layout control having a property to indicate where to add the new field.

9. The method of claim 6, further comprising providing a user an option to determine whether to add the new field to the graphical database object.

10. The method of claim 6, wherein the graphical database object is selected from the group comprising: a database object and a database report.

11. The method of claim 6, wherein the recordset schema is a collection of records made available to the graphical database object.

12. The method of claim 6, positioning the new field to a place determined by a placeholder control comprises positioning the new field to a place determined by a placeholder control comprising at least one of the following keywords: placeholder left, placeholder right, placeholder up and placeholder down.

13. A system for updating a graphical database object in a database, the system comprising:
   a memory for storing executable program code; and
   a processing unit, functionally coupled to the memory, the processor being responsive to computer-executable instructions contained in the program code and operative to:
      utilize a schema update module programmed to update a database schema in the database; and
      utilize a graphical database object update module programmed to update the graphical database object in response to detecting a database schema change, wherein the graphical database object update module comprises a find module programmed to find a new field to be added for the graphical database object due to the database schema change, wherein finding a new field comprises:
         determining whether the database schema has changed;
         comparing the updated database schema to a previous database schema to determine whether the updated database schema includes a new field not in the previous database schema; and
         comparing each field in the updated database schema to each field in the previous database schema to determine whether each field in the updated database schema has a matched bound control in the previous database schema, wherein determining whether each field in the updated database schema has a matched bound control in the previous database schema comprises determining, for each field, whether there is at least one of a plurality of bound controls for the field in the updated database schema, wherein the plurality of bound controls comprise controls placed on the graphical database object for entering, displaying and editing field data, wherein a field in the updated database schema having no matched bound control indicates the field to be a new field not in the previous database schema, wherein the graphical database object update module further comprises:
      a positioning module programmed to position the new field to a place in the graphical database object, wherein the positioning module comprises a placeholder control to determine where to position the new field in the graphical database object, the placeholder control comprising a label and text box pair with a keyword in a placeholder control tag, the tag comprising a string placeholder which is added to the label and the text box, the string placeholder enabling interaction with the label and the text box;
      a display module programmed to display the graphical database object with the new field;
      a user option module programmed to provide a user an option to determine whether to add the new field to the graphical database object; and
      an auto-update module programmed to automatically add the new field to the graphical database object.

14. The system of claim 13, wherein the placeholder control is a label and text box pair with a keyword in a tag of the control.

15. The system of claim 13, wherein the positioning module comprises a new control having special properties to specify where to add the new field in the graphical database object.

16. The system of claim 13, wherein the positioning module comprises a layout control having a property to indicate where to add the new field in the graphical database object.

17. The system of claim 13, wherein the graphical database object is selected from the group comprising: a database form and a database report.

18. The system of claim 13, wherein the keyword comprises at least one of the following: placeholder left, placeholder right, placeholder up and placeholder down.

* * * * *

UNITED STATES PATENT AND TRADEMARK OFFICE
CERTIFICATE OF CORRECTION

| | | |
|---|---|---|
| PATENT NO. | : 7,979,477 B2 | |
| APPLICATION NO. | : 12/049306 | |
| DATED | : July 12, 2011 | |
| INVENTOR(S) | : Michael J. McCormack et al. | |

It is certified that error appears in the above-identified patent and that said Letters Patent is hereby corrected as shown below:

In title page, item (75), under "Inventors" column 1, line 3, delete "Paul Karimov" and insert
    -- Pavel Karimov --, therefor.

Signed and Sealed this

Sixteenth Day of August, 2011

David J. Kappos
*Director of the United States Patent and Trademark Office*